United States Patent [19]

Altmansberger et al.

[11] 4,434,060
[45] Feb. 28, 1984

[54] REMOVAL OF HEAVY METALS CONTENT

[75] Inventors: David C. Altmansberger; Christina L. Huss; Haans H. Kroger, all of Gainesville, Fla.

[73] Assignee: General Electric Company, N.Y.

[21] Appl. No.: 385,208

[22] Filed: Jun. 4, 1982

Related U.S. Application Data

[63] Continuation of Ser. No. 210,194, Nov. 25, 1980, abandoned.

[51] Int. Cl.$^3$ ............................................. C02F 1/52
[52] U.S. Cl. .................................... 210/724; 210/778; 210/912
[58] Field of Search ............... 210/912, 688, 667, 777, 210/778, 721, 192, 764, 423/144, 104

[56] References Cited

U.S. PATENT DOCUMENTS 3,575,854  4/1971  Richards ............................ 210/912
3,721,729  3/1973  Schulte-Schrepping et al. ... 423/144
3,959,129  5/1976  White et al. ........................ 210/667

FOREIGN PATENT DOCUMENTS 51-20823  6/1976  Japan ................................. 210/912

OTHER PUBLICATIONS

McVaugh, J. et al.; "Optimization of Heavy Metals Wastewater Treatment Effluent Quality Versus Sludge Treatment"; 31st Ind. Waste Conf. Purdue Univ., pp. 17–25, (1976).
Culp, G. L. et al., "New Concepts in Water Purification"; Van Nostrand Reinhold Co.; pp. 218–229, (1974).

Primary Examiner—Benoit Castel
Attorney, Agent, or Firm—Pollock, Vande Sande & Priddy

[57] ABSTRACT

Reducing the heavy metals content of an aqueous composition which includes adding lime to the composition and filtering the composition.

13 Claims, 1 Drawing Figure

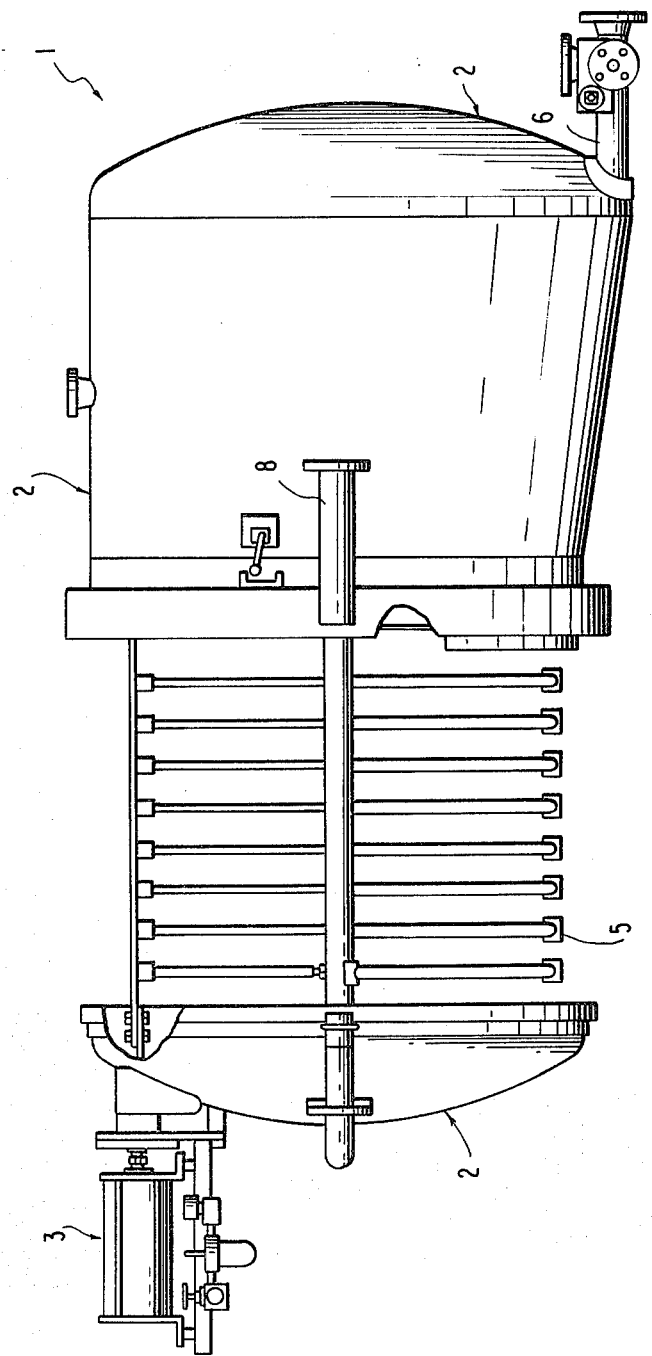

REMOVAL OF HEAVY METALS CONTENT

This is a continuation of application Ser. No. 210,194, filed Nov. 25, 1980, now abandoned.

DESCRIPTION

1. Technical Field

The present invention is concerned with reducing the concentration of heavy metals from an aqueous composition, and especially for the removal of nickel, cadmium and/or cobalt from an aqueous composition. The present invention is especially applicable for processing waste caustic aqueous compositions which contain, in addition to the heavy metals content, caustic soda and sodium nitrate to provide a product having the original or substantially the original amount of caustic soda and sodium nitrate but with significantly reduced amounts of heavy metals. Accordingly, the treated caustic aqueous composition can then, in turn, be used instead of requiring further purification.

2. Background Art

In the manufacture of batteries, as in many industrial manufacturing processes, large quantities of aqueous compositions are employed which become contaminated. For instance, undesired levels of heavy metals contaminate water and other aqueous compositions employed in the manufacture of batteries. These aqueous compositions must be treated so that they can be recycled and reused or employed elsewhere, and/or discharged into nearby natural waterways.

Alkali metal hydroxides, and especially aqueous sodium hydroxide compositions, are used in many manufacturing processes, such as in the production of batteries, including nickel-cadmium batteries. For instance, the positive electrode of a nickel-cadmium battery can be constructed by impregnating nickel nitrate into a highly porous, pure nickel, sintered spongelike structure. The nickel nitrate can be coverted to nickel hydroxide in the chemical impregnation process by precipitation from sodium hydroxide.

Construction of the negative electrode starts by impregnating the nickel sintered plaque with a cadmium nitrate solution. Cadmium nitrate can be converted to cadmium hydroxide by precipitation in a caustic solution. Large quantities of aqueous alkali hydroxide compositions become contaminated with heavy metals, such as cadmium and nickel and must be treated.

DISCLOSURE OF INVENTION

The present invention is concerned with treating aqueous compositions, and particularly concerned with removing heavy metal content from the aqueous composition. The present invention is especially directed to the treatment of aqueous alkali metal compositions whereby the treatment provides a product having the original or substantially the original amount of alkali metal present but contains significantly reduced amounts of heavy metals. The present invention includes reducing the heavy metals content of an aqueous composition by adding lime to the composition. The lime is added in an amount sufficient to cause precipitation of the heavy metals from the aqueous composition. The aqueous composition containing the lime is filtered to thereby obtain reduced heavy metal content. The preferred filter media comprises filter leaves which contain a coating of a filter aid such as diatomaceous earth thereon. The filter leaves are arranged vertically with respect to the flow of the aqueous composition.

BRIEF DESCRIPTION OF DRAWING

The FIGURE is a schematic diagram of a filtration unit in the opened position which can be employed in the present invention.

BEST AND VARIOUS MODES FOR CARRYING OUT INVENTION

For convenience, the process of the present invention will be described with particular applicability to the treatment of an aqueous alkali metal composition which is contaminated with heavy metals, and, especially, with nickel and/or cobalt and/or cadmium. In particular, the preferred aqueous composition treated according to the present invention generally contains at least about 1, and usually at least about 2 ppm, and up to about 400 ppm of heavy metal content. The term "metal content" and similar terms used herein refer to metals per se and the metal portion of metal compounds, such as salts which may be present in the compositions. Heavy metals removed by the process of the present invention are those generally having atomic weights of at least 55. The heavy metal contaminants include Group VI metals, such as iron, cobalt, nickel; Group IIB metals, such as zinc and cadmium; Group IB metals, such as copper; and Group IVA metals, such as lead. The process of the present invention is most applicable to those aqueous compositions contaminated with nickel and/or cadmium and/or cobalt.

The preferred compositions treated according to the present invention also contain varying amounts of alkali metal hydroxides, such as sodium hydroxide and alkali metal salts, such as sodium nitrate. Typical aqueous compositions treated according to the present invention contain about 1-200 ppm of nickel; about 1-200 ppm of cadmium; about 1-30% by weight of sodium hydroxide; and about 1-30% by weight of sodium nitrate. The typical compositions treated also can contain up to about 4% sodium carbonate. The pH of compositions treated according to the present invention is generally 14 and above. A typical composition treated according to the present invention contains about 10 ppm nickel; about 40 ppm of cadmium, about 14% by weight of sodium hydroxide, and about 14% by weight of sodium nitrate. Such may also contain about 1% by weight of sodium carbonate.

The process of the present invention makes it possible to reduce the levels of both the nickel and cadmium to below 1 ppm (e.g. to levels of about 0.5 ppm each or less) while maintaining the concentration of the sodium hydroxide and sodium nitrate at the original level. In addition, the process of the present invention is effective in reducing the heavy metals below 1 ppm regardless of the amount of sodium nitrate and sodium hydroxide present in the composition.

The present invention requires the addition of lime to the aqueous composition in order to effect removal of the heavy metal content therefrom. The lime is added in an amount sufficient to cause precipitation of the heavy metals upon subsequent filtration. A lime employed according to the present invention is referred to as "air-floated" lime, since the particle size range is achieved by classification with air floatation. The use of limes other than "air-floated" lime (e.g. those having particle sizes different from "air-floated" lime) tends to result in clogging or blinding of the filter leaves in shorter amounts of time than achieved by employing the "air-floated" lime.

The lime is usually employed in amounts of at least about 0.5% by weight based upon the weight of the aqueous composition to achieve reduction of the heavy metals to values below 1 ppm. However, use of lime in amounts as low as about 0.1% by weight is effective for providing a significant reduction in the heavy metals content and is within the scope of the present invention. The maximum amount of lime is merely limited by practical and economical considerations and is usually no more than about 20% by weight.

According to a preferred aspect of the present invention, a filter aid is also added to the aqueous composition. Filter aids are materials of low specific gravity, chemically inert to the material being filtered, and are porous and aid in the flow or filtration of the material through the particular filter media employed. The preferred filter aids employed according to the present invention are diatomaceous earth and perlite with diatomaceous earth being the most preferred. Other filter aids include Fuller's earth, charcoal, asbestos, sawdust, magnesia, macerated paper pulp, and bagacillo. The amount of filter aid employed is usually at least about 0.1%, and preferably about 0.5% by weight basd upon the weight of the aqueous composition. The maximum amount being limited merely by practical and economical considerations and is usually no more than about 20% by weight. A particular filter aid employed is High Flow Super Cel from Johns Manville which is a diatomaceous earth with at least 94% of the particles passing through a 150 mesh screen.

The aqueous composition is then subjected to filtration to effect removal of the heavy metals from the composition. The process does not result in a change of the original content of the alkali metal materials in the aqueous solution. In the preferred aspect of the present invention, the filter media includes filter leaves which contain a coating of filter aid, and especially of diatomaceous earth thereon. The precoating of filter aid, such as diatomaceous earth, is usually from about 0.1 to about 0.3 lbs. on a dry basis of filter aid, such as diatomaceous earth per square foot of filter area. This provides a cake thickness on the filter leaves of about 1/16" to about ¼". The precoating is accomplished by circulating a slurry of the filter aid and water between the filter and a tank which holds the diatomaceous earth. The slurry is agitated so as to maintain the diatomaceous earth in suspension in the water.

The precoating of the filter leaves with the diatomaceous earth prevents the filter from becoming clogged by impurities, provides immediate clarity, and facilitates easy cleaning after filtration.

The preferred material employed for the filter leaves is polypropylene. Other materials employed for the filter leaves include stainless steel wire. The leaves are generally in a vertical position with respect to the flow of the aqueous composition therethrough.

The filter leaves preferably provide openings of less than about 5 mils. Examples of weaves for suitable leaves include 60×70 twill, 70×80 twill, and 24×100 single Dutch weave.

The rate of filtration employed is generally about ¼ to about 1, and preferably about ½ gallon of aqueous composition per minute per square foot of filter media.

The FIGURE is a schematic diagram of a filter unit in the open position which is suitable for use in the present invention. Of course, when in use such is in the closed position. The numeral 1 represents the casing of the filter which can be of any material resistant to the alkaline compositions flowing through the filter. A typical casing is carbon steel with an epoxy coating in the interior. The casing 1 includes side walls 2. The material to be filtered is caused to flow via conduit 6 into the filter. Within the filter casing is a plurality of filter leaves or filter plates 5 which are positioned vertically to the direction of flow of the material being filtered. The filtered material is removed from the filter via conduit 8. The numeral 3 refers to an air operated motor used to vibrate the leaves 5 to remove cake therefrom.

What is claimed is:

1. A process for reducing the heavy metals content of an aqueous composition containing heavy metal having an atomic weight of at least 55 and including at least one metal from the group of nickel, cadmium, and cobalt; alkali metal hydroxide and alkali metal salts wherein the pH of said aqueous composition is at least about 14 which comprises adding a filter aid to said aqueous composition in an amount of at least about 0.1% by weight based upon the weight of the aqueous composition, and adding lime to the composition in an amount of at least about 0.1% by weight and being sufficient to cause precipitation of said heavy metals and then filtering said composition to thereby reduce the heavy metals content and wherein the amounts of said hydroxide and said salts in the composition after filtering are substantially the same as the initial content thereof prior to filtering.

2. The process of claim 1 wherein the amount of lime employed is at least about 0.5% by weight based upon the weight of the aqueous composition.

3. The process of claim 1 wherein said filter aid is diatomaceous earth or perlite.

4. The process of claim 3 wherein said filter aid is at least about 0.5% by weight based upon the weight of the aqueous composition.

5. The process of claim 1 wherein said filter aid is diatomaceous earth.

6. The process of claim 1 wherein said filtering includes contacting the composition with a filter media in the form of filter leaves containing a coating of filter aid therein and openings of less than about 5 mils.

7. The process of claim 6 wherein said coating of filter aid is diatomaceous earth.

8. The process of claim 7 wherein the coating of diatomaceous earth is about 0.1 to about 0.3 lbs. on a dry basis of diatomaceous earth per square foot of filter area.

9. The process of claim 1 wherein said aqueous composition also contains sodium hydroxide and sodium nitrate.

10. The process of claim 1 wherein said composition contains up to about 400 ppm of said heavy metal.

11. The process of claim 1 wherein said composition contains about 1-200 ppm of nickel, about 1-200 ppm of cadmium, about 1-30% by weight of sodium hydroxide, and about 1-30% by weight of sodium nitrate.

12. The process of claim 1 wherein each of the heavy metals is reduced to an amount less than 1 ppm.

13. The process of claim 1 wherein the rate of filtering is about ¼ to about 1 gallon of aqueous composition per minute per square foot of filter media.

* * * * *